United States Patent [19]
Drnevich et al.

[11] Patent Number: 5,865,878
[45] Date of Patent: Feb. 2, 1999

[54] METHOD FOR PRODUCING OXIDIZED PRODUCT AND GENERATING POWER USING A SOLID ELECTROLYTE MEMBRANE INTEGRATED WITH A GAS TURBINE

[75] Inventors: Raymond Francis Drnevich, Clarence Center; Christian Friedrich Gottzmann, Clarence, both of N.Y.

[73] Assignee: Praxair Technology, Inc., Danbury, Conn.

[21] Appl. No.: 848,258

[22] Filed: Apr. 29, 1997

[51] Int. Cl.$^6$ .......................... B01D 53/22; B01D 46/46; B01D 17/06
[52] U.S. Cl. .................................. 95/54; 95/14; 205/765
[58] Field of Search ........................... 95/54, 14; 205/765

[56] References Cited

U.S. PATENT DOCUMENTS

| | | | |
|---|---|---|---|
| 3,901,669 | 8/1975 | Seitzer | 55/16 |
| 4,120,663 | 10/1978 | Fally | 422/198 |
| 5,360,679 | 11/1994 | Buswell et al. | 429/19 |
| 5,562,754 | 10/1996 | Kang et al. | 95/54 |
| 5,733,435 | 3/1998 | Prasad et al. | 205/765 |

FOREIGN PATENT DOCUMENTS

| | | |
|---|---|---|
| 0748648 | 12/1996 | European Pat. Off. . |
| 0778069 | 11/1997 | European Pat. Off. . |
| 1242401 | 9/1989 | Japan . |

*Primary Examiner*—Gary Geist
*Assistant Examiner*—Jafar Parsa
*Attorney, Agent, or Firm*—Bernard Lau

[57] ABSTRACT

A process for producing an oxidized product in conjunction with a turbine for generating power. This process comprises contacting a compressed and heated oxygen-containing gas stream with at least one solid electrolyte oxygen selective ion transport membrane in a membrane reactor. A reactant is passed into the reactor to generate an oxidized product therefrom. Oxygen-depleted retentate stream from the reactor is added to a gas turbine combustor and expanded in a gas turbine to generate power.

20 Claims, 7 Drawing Sheets

METHOD FOR PRODUCING OXIDIZED PRODUCT AND GENERATING POWER USING A SOLID ELECTROLYTE MEMBRANE INTEGRATED WITH A GAS TURBINE

CROSS REFERENCE

U.S. patent application Ser. No. 08/848,200 (Attorney Docket No. 20288) entitled "Method of Producing Hydrogen Using Solid Electrolyte Membrane", filed concurrently herewith, is incorporated herein by reference.

FIELD OF THE INVENTION

This invention relates to methods for producing oxidized products and generating power using a solid electrolyte ionic or mixed conductor membrane integrated with a gas turbine. In particular, this invention is directed to methods for producing synthesis gas and generating power using a solid electrolyte ionic or mixed conductor membrane integrated with a gas turbine.

BACKGROUND OF THE INVENTION

In gas turbine systems for generating power, feed air is compressed and combusted with a reactant to raise its temperature, and subsequently expanded through a turbine to produce power. Oxygen producing equipment has been combined with some of these gas turbine systems to produce oxygen at an incremental cost. Gas turbine power systems have also been combined with steam power generating systems to generate additional power, where the expanded hot gas may also be used to generate steam.

One type of oxygen producing equipment utilizes solid electrolyte ion transport membrane. The ion transport system operates at a significantly higher temperature, in the range of from about 500° C. to about 1200° C., than the compressor discharge of a gas turbine system, whose operating temperature rarely reaches 375° C.

There are now two types of solid electrolyte ion transport membranes under development. They include ionic conductors that conduct only ions through the membrane and mixed conductors that conduct both ions and electrons through the membrane. An ion transport membrane exhibiting mixed conduction characteristics can transport oxygen when subjected to a ratio of partial pressures of oxygen across the membrane without the need for an applied electric field or external electrodes which would be necessary with ionic only conductors. As used herein, the terms "solid electrolyte ion transport system", or simply "solid electrolyte" or "ion transport membrane" is used to designate either a system using an ionic-type (electrically-driven) system or a mixed conductor-type (pressure-driven) system unless otherwise specified.

Mixed conductors are materials which, at elevated temperatures, contain mobile oxygen-ion vacancies that provide conduction sites for selective transport of oxygen ions through the material. The transport is driven by the ratio of oxygen activities, i.e., oxygen partial pressures ($P_{O_2}$) across the membrane, as oxygen ions flow from the side with higher partial pressure of oxygen to that with lower partial pressure of oxygen. Ionization of oxygen molecules to oxygen ions takes place on the cathode-side (or the retentate zone) of the membrane. The oxygen ions recombine on the permeate zone of the membrane giving up electrons. For materials that exhibit only ionic conductivity, external electrodes are placed on the surfaces of the electrolyte and the electrons are returned to the cathode in an external circuit. In mixed conducting materials, electrons are transported to the cathode internally, thus completing the circuit and obviating the need for external electrodes. It is believed that the reaction of the permeated oxygen with fuel takes place on the surface or in the boundary layers rather than in the bulk phase on the anode-side (or the permeate zone).

Partial oxidation reactions (POx) involving carbonaceous feedstock are common methods for producing synthesis gas. Partial oxidation is also used to produce ethylene oxide, acrylonitrile and other chemicals. Synthesis gas, comprised of carbon monoxide and hydrogen, is a valuable industrial gases and important precursors for production of chemicals including ammonia, alcohols (including methanol and higher carbon alcohols), synthesis fuels, aldehydes, ethers, and others. Feedstocks including natural gas, coal, naphtha, and fuel oils are commonly used to produce synthesis gas by partial oxidation or steam reforming reactions. The partial oxidation reactions may be further represented as follows:

where $C_mH_n$ is a hydrocarbon feedstock.

To a minor degree, steam reformation may also take place, as is represented as follows:

where $C_mH_n$ is a hydrocarbon feedstock.

Conventional POx processes frequently use oxygen molecules produced by traditional gas separation processes (for example, pressure swing adsorption, cryogenic distillation) that typically operate at temperature below 100° C. Since POx itself typically requires a high temperature of operation of more than 800° C., integration between partial oxidation reaction and traditional oxygen separation is not realized by the conventional process. As a result, conventional partial oxidation has often been characterized by low feedstock conversion, low hydrogen to carbon monoxide ratio, and low hydrogen and carbon monoxide selectivities. Additionally, the external oxygen supply typically required in a partial oxidation reaction adds significantly to capital and operating costs, which may amount to as much as 40% of the total synthesis gas production cost.

It should be noted that the use of a solid electrolyte membrane for POx in an electrochemical reactor has been disclosed in U.S. Pat. Nos. 5,160,713 and 5,306,411, both to Mazanec et al., but neither of these patents disclose processes to produce an oxidized product in conjunction with a synergistic use of a gas turbine system.

Two of the most attractive features of the ion transport membrane system are the membrane's infinite selectivity for oxygen transport and its ability to transport oxygen from a low pressure stream to a high pressure stream as long as a ratio of partial oxygen pressure of greater than 1 exists, as is the case when the permeated oxygen reacts with a fuel gas. For the purpose of this invention, ion transport membrane materials that transport oxygen ions are deemed useful for the separation of oxygen from oxygen-containing gas mixtures. The types of membrane materials proficient in transporting oxygen ions are discussed in commonly assigned U.S. patent application Ser. No. 08/490,362, entitled "Method for Producing Oxygen and Generating Power Using a Solid Electrolyte Membrane Integrated with a Gas Turbine", filed Jun. 14, 1995, and concurrently filed application Ser. No. 08/848,200, entitled "Method of Producing Hydrogen Using Solid Electrolyte Membrane", which are incorporated herein by reference.

U.S. patent application Ser. No. 08/490,362 discloses methods for utilizing high combustor temperatures reached by a power generation system to drive an oxygen production system at acceptable operating temperatures for both systems. That application also discloses a method which efficiently produces both oxygen and power as products. U.S. Pat. Nos. 5,516,359, 5,562,754, 5,565,017 and European Patent Publication No. 0 658 366 produce oxygen in processes that are integrated with a gas turbine.

The efficient use of ion transport systems to produce other chemical gas products in conjunction with gas turbine power generating capacities is not believed to have been previously realized. Although the concept of integrating an air separation unit with gas turbine systems are known, there has not believed to have been synergistic use of energy integration between the air separation unit wherein oxidized products are produced in conjunction with gas turbine systems with which an ion transporting oxygen separating membrane is integrated.

OBJECTS OF THE INVENTION

It is therefore an object of the invention to provide an improved process for making efficient use of an ion transport membrane reactor to produce oxidized products, such as synthesis gas, in which the reactor is integrated with a power generation system to produce both power and the oxidized product.

It is another object of the invention to provide a synergistic use of high temperature gas discharge from the ion transport system for feeding a gas turbine combustor in a synergistic manner, wherein an oxidized product such as synthesis gas is produced using a solid electrolyte membrane.

It is another object of the invention to provide a process which efficiently utilizes the oxygen-depleted retentate gas emerging from an ion transport membrane reactor by feeding it into a power generation system.

It is yet another object of the invention to provide a process which efficiently utilizes the combination of oxygen-permeated gas and reactant (and optionally, a moderator) to produce oxidized products, such as synthesis gas, in an ion transport membrane reactor.

It is a further object of this invention to provide process systems which utilizes high combustion temperatures reached by a power generation system to produce power and to facilitate ion transport in an ion transport membrane reactor.

SUMMARY OF THE INVENTION

This invention comprises a process for producing oxidized products, such as synthesis gas, in conjunction with a gas turbine system for generating power. This process includes contacting a compressed and heated oxygen-containing gas stream, typically air, with at least one solid electrolyte oxygen ion transport membrane in a reactor. The reactor has a retentate zone and a permeate zone separated by the membrane, wherein at least a portion of oxygen is transported across the membrane from the retentate zone to the permeate zone to generate a permeate stream and an oxygen-depleted retentate stream. A reactant such as a hydrocarbon is passed into the permeate zone to react with the transported oxygen to generate the oxidized product. The oxygen-depleted retentate stream is added to a gas turbine combustor where it is heated by combustion reactions with a fuel and forms a combusted oxygen-depleted gas stream, which is recovered from the gas turbine combustor and expanded in a turbine expander to generate power.

In an alternative embodiment, substantially sulfur-free synthesis gas is produced in conjunction with a turbine for generating power. A compressed and heated oxygen-containing gas stream is contacted with at least one solid electrolyte oxygen selective ion transport membrane in a membrane reactor. This reactor has a feed zone and a permeate zone separated by the membrane, wherein at least a portion of oxygen is transported across the membrane from the feed zone to the permeate zone to generate a permeate stream and an oxygen-depleted retentate stream. Steam and organic fuel are passed into the permeate zone to react with the transported oxygen to generate synthesis gas. The synthesis gas is passed into an acid gas remover to recover sulfur to form a substantially acid-free synthesis gas. The oxygen-depleted retentate stream is fed to a gas turbine combustor, and the combusted oxygen-depleted gas stream recovered from the gas turbine combustor is expanded in a turbine expander to generate power.

In a preferred embodiment, the compressed oxygen-containing gas stream is extracted from the gas turbine air compressor. The process further comprises obtaining an expanded, oxygen-depleted gas stream from the turbine and recovering heat from the expanded, oxygen-depleted gas stream. A moderator is added to the reactant-containing gas stream prior to contacting the membrane.

BRIEF DESCRIPTION OF THE DRAWINGS

Other objects, features and advantages will occur to those skilled in the art from the following description of preferred embodiments and the accompanying drawings, in which.

DETAILED DESCRIPTION OF THE INVENTION

This invention may be accomplished by using the heat generated by partial oxidation reactions to provide at least a portion of the energy needed to generate power from a gas turbine. The lean air (oxygen-depleted retentate gas) is heated by the thermal energy, conducted across the ion transport membrane, from the partial oxidation reactions. The heated lean air is then introduced into the gas turbine system to convert the heat from the chemical reactions into mechanical energy while oxidized product is generated in the permeate zone of the ion transport membrane.

The present invention integrates the combination of ion transport membrane partial oxidation reactor (separator) systems with gas turbines. Partial oxidation is the primary reaction in the reactor, and is highly exothermic. Steam reforming reaction, an endothermic reaction, may take place, but preferably in a minor amount. This invention is directed to the production of an oxidized product such as synthesis gas, as well as the production of numerous other chemicals, including but not limited to methanol, ammonia and urea, or for the production of hydrogen and/or carbon monoxide for use in the chemical, petrochemical and refining industries.

As used herein, the term, "retentate zone" is defined as the area within the ion transport membrane reactor confined by the reactor walls, gas inlet/outlets and the ion transport membrane, in which oxygen-containing gas, generally feed air, traverses and from which oxygen has transported to a separate area across the membrane. The resulting gas stream in the retentate zone is at least partially depleted of oxygen.

As used herein, the term "permeate zone" refers to the area within the ion transport membrane reactor in which oxygen from the retentate zone has transported across the ion transport membrane. Due to the infinitely oxygen selective nature of the ion transport membrane, the resulting gas emerging from the membrane in the permeate zone is pure oxygen gas.

As used herein, "oxidized product" refers to products which have been partially or completely oxidized within the permeate zone of the reactor.

It should be noted that various embodiments of this invention are directed to retrofitting systems having certain already existing components or incorporation within existing gas turbine designs. Supplemental oxygen-containing gas and supplemental gas compressors and/or intercooling units are used to provide the necessary oxygen for production of oxidized products such as synthesis gas and/or for pre-turbine combustion.

Figure 1:
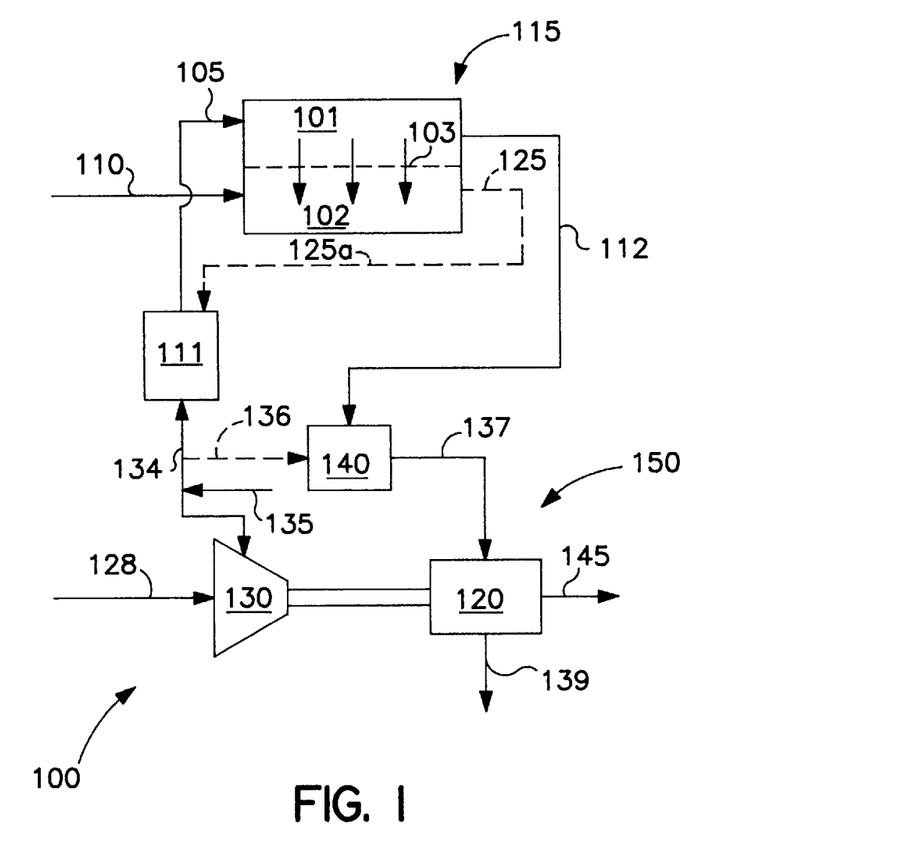
FIG. 1 is a schematic representation of the main components of a system for both producing an oxidized product and generating power according to this invention.

The methods of this invention may be used with a variety of modifications to the system described herein. FIG. 1 depicts a general embodiment thereof. As shown in System 100, FIG. 1, oxygen-containing gas stream 105 passes through retentate zone 101 of gas reactor 115, which comprises at least one solid electrolyte ion transport membrane. Reactor 115 is integrated with a gas turbine system 150, which comprises a gas compressor 130, a gas-turbine combustor 140 and a gas turbine 120. A retentate portion of oxygen-containing gas stream 105 passing through reactor 115 emerges as oxygen-depleted retentate gas stream 112, which is directed to gas-turbine combustor 140.

Reactant stream 110 combines with the oxygen permeated gas that has transported across solid electrolyte ion transport membrane 103 into permeate zone 102, emerging as partial oxidation product stream 125 therefrom.

In one embodiment heater 111 is a heat exchanger and partial oxidation product stream 125 (125a), and optionally stream 112, are passed through heat exchanger 111. Partial oxidation product stream 125 optionally passes through heat exchanger 111 to emerge as cooler partial oxidation product stream 127.

In a preferred embodiment, partial oxidation product stream 125 is derived from oxygen-containing gas stream 128 which passes through compressor 130 to emerge as compressed oxygen-containing gas stream 135. A first portion 134 of stream 135 traverses through heater 111 forming the heated, compressed oxygen-containing gas stream 105 prior to entering reactor 115, and optionally second portion 136 of stream 135 is directed to gas-turbine combustor 140. Portion 136 of compressed oxygen-containing gas stream 135 enters gas-turbine combustor 140, as does oxygen depleted gas stream 112. Compressed stream 137 containing products of combustion and oxygen depleted gas is directed into turbine 120 to generate power 145, as well as to drive compressor 130 by shaft 142. Emerging from gas turbine 120 is turbine exhaust 139, which may optionally be passed as waste, or to a steam cycle, or to other uses known to the skilled artisan.

It is important (at the present state of material technology) to limit the temperature rise of the membrane elements in the reactor to about 1250° C., preferably 1100° C., to avoid significant degradation of the membrane material by the loss of oxygen from the material to the reducing (anode) side. This can be accomplished by balancing the exothermic heat of the partial oxidation reaction with the endothermic steam reforming reaction and the sensible heat from the temperature rise of the feed gases to the ion transport reactor. This consideration may favor maximizing the mass flow of the oxygen containing gas through the system. Special consideration is given to the internal heat transfer design of the reactor to avoid excessive lowering of the membrane element temperature (should be greater than 700° C. to 800° C.). The design must provide high heat transfer coefficients where the temperature difference between the reactor element and the oxygen-containing gas is small and small coefficients where the temperature difference is large. Typically, fluid stream inlet temperatures should be between 300° C. and 700° C.

Figure 2:
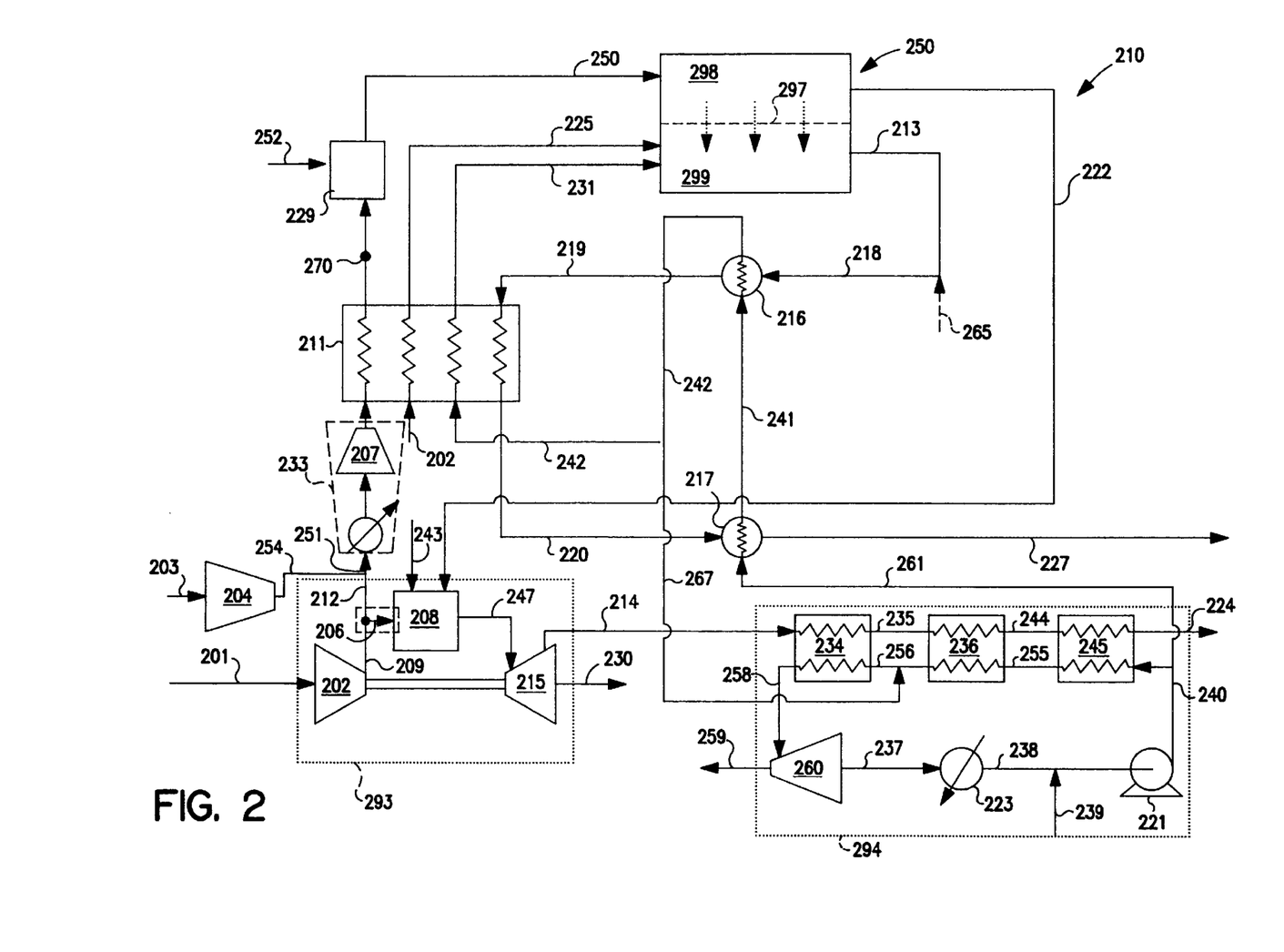
FIG. 2 is a schematic representation of a system for producing synthesis gas and generating power according to this invention in which heat is recovered from the permeate product and/or the gas turbine exhaust to form steam for subsequent use, further wherein only a portion of oxygen-containing gas is directed to the ion transport membrane.

In system 220, FIG. 2, an ion transport membrane-containing reactor 205 is integrated with a gas turbine for synthesis gas production and power generation according to this invention. A compressed gas stream is heated by passage through a heat exchanger in countercurrent flow against the exhaust from the ion transport membrane stage. A water source from an attached Rankine power generator is heated by indirect exchange of heat against the synthesis gas to form steam thereby, wherein the steam is recycled back to the Rankine power generator for further addition of heat and subsequent powering of the steam turbine in the Rankine power generator.

In this embodiment, oxygen-containing gas stream 201 is compressed by compressor 202, forming compressed, oxygen-containing gas 209. A portion 206 of air stream 209 is directly fed into combustor 208.

Generally, a significant volume of compressed gas is needed to operate a gas turbine system. As used herein, the amount of compressed oxygen-containing gas that is fed to operate a gas turbine ranges up to about 95% of the total compressed oxygen-containing gas.

To maintain sufficient oxygen-containing gas for supporting synthesis gas production in reactor 205 such that the gas turbine system operates at its maximum output or efficiency, additional oxygen-containing gas is used. Supplemental oxygen-containing gas 203 is fed through compressor 204 forming compressed supplemental oxygen-containing gas 254. A portion 212 of compressed oxygen-containing gas stream 206 is combined with the compressed supplemental oxygen-containing gas stream 254 forming compressed oxygen-containing gas stream 251.

It should be noted that supplemental oxygen-containing gas is generally used with existing gas turbine designs. This is because pre-existing designs may not contain sufficient sources of oxygen-containing gas to support the reactions within reactor 205. For gas turbines designed for the process of this invention, sufficient oxygen-containing gas would have been provided and the supplemental oxygen-containing gas would not be necessary.

Gas stream 251 is heated in heat exchanger 211 against the flow of hot product from reactor 205. After emerging from heat exchanger 211, heated compressed gas stream 270 has a temperature in the range of from about 300° to about 800° C., preferably from about 400° to about 650° C. Further heating of compressed oxygen-containing gas stream 270 may be required for the high temperature operation required in the reactor 205. This is especially true if significant amounts of steam are fed to the reactor to maximize the steam reforming reaction and achieve high hydrogen:carbon monoxide ratio for the synthesis gas.

Heated, compressed oxygen-containing gas stream 270 then enters combustor 229 forming combusted, compressed gas stream 250, which emerges from combustor 229 and enters retentate zone 298 of reactor 205. The combusted, compressed gas stream emerging from combustor 229 is then sufficiently hot to effect ion transport as it enters retentate zone 298 of reactor 205. In retentate zone 298, oxygen is typically removed from gas stream 250 within the range of about 2% to about 50% of oxygen contained in stream 250. The feed flow to reactor 205 should be within that percentage ratio of the feed flowing to the gas turbine referred to above. The resulting oxygen separated through ion transport membrane 297 is reacted with reactant 225 and steam 231 within permeate zone 298 of reactor 205.

Reactant 225 is heated in heat exchanger 211 prior to feeding into reactor 205. Reactant 225 may be any hydrocarbon reactant capable of combining with oxygen gas to produce synthesis gas. Preferably, the reactant is a lower chain saturated hydrocarbon gas like methane, ethane or propane.

Steam 231 serves as the moderator to optimize temperature and reaction condition for generating synthesis gas using oxygen gas and a reactant through the water-gas shift reaction. Steam 231 is further preheated through heat exchanger 211 prior to feeding into reactor 205.

Oxygen is removed from compressed gas stream 250 through ion transport membrane 297 in reactor 205. The permeated oxygen is then reacted with reactant 225 and steam 231 in permeate zone 299 of reactor 205.

Reactant 225 and steam 231 are prepared and preheated prior to reacting in permeate zone 299. Synthesis gas product 213 is produced by the reaction of permeated oxygen with reactant 225 and steam 231.

Synthesis gas product 213 is produced by the reaction of the permeated oxygen gas in permeate zone 299 of reactor 205 with reactant 225 and steam 231, which enter permeate zone 299 of reactor 205. The resulting product emerging from reactor 205 is hot synthesis gas 213, generally between the membrane operating temperature range of from about 500° C. to about 1200° C., with the temperature range of from about 900° C. to about 1100° C. being more preferred. The membrane temperature is maintained between about 500° C. and 1200° C. by balancing the integral heats of reaction and the sensible heat derived from the temperature rise of the gas streams internal to the reactor. See, U.S. patent application Ser. No. 08,848,199 entitled "Integrated Solid Electrolyte Ionic Conductor Separator-Cooler" (Attorney Docket No. D-20356), and U.S. patent application Ser. No. 08/848,204 entitled "Solid Electrolyte Ionic Conductor Reactor Design" (Attorney Docket No. D-20352), both filed currently herewith and both incorporated herein by reference.

Synthesis gas product 213 emerges from reactor 205 at a high temperature. A number of devices may be used to transfer the heat energy from synthesis gas product 213 to other heat recipient components in system 210. The temperature of the synthesis gas stream 213 may optionally be initially lowered by the use of a quencher 265 to form synthesis gas stream 218 with a temperature ordinarily manageable for heat transfer in conventional devices. Quencher 265 is preferably water, but may be any coolant known to those skilled in the art. Synthesis gas stream 218 is then passed through boiler device 216 against water stream 241, such that water stream 241 is converted to steam 242, and forms synthesis gas stream 219. Synthesis gas stream 219 retains sufficient heat such that synthesis gas stream 219 transfers heat against compressed, oxygen-containing gas stream 251, reactant 225 and a portion of stream 242 in heat exchanger 211 emerging as moderator gas stream 231. The resulting temperature of synthesis gas stream 220 is high enough to transfer energy to water 261 in yet another heat transfer device 217, thus forming final synthesis gas crude product 227 and conversion of cool water 261 to warm water 241.

Oxygen-depleted compressed retentate exhaust gas stream 222 emerges from retentate zone 298 of reactor 205 and is added to the turbine combustor 208, which decouples the operating temperature of the reactor 205 from that of the turbine 293. Heated, oxygen-depleted compressed gas stream 247 emerges from combustor 208 and enters expansion turbine 215 to produce net power 230. The shaft power can be used to produce electricity through a generator or power another device such as a compressor.

Optionally, expanded oxygen-depleted gas stream 214 operates a Rankine power generation cycle. Hot gas stream 214 enters a plurality of heat exchangers 234, 236 and 245 to yield boiling gas stream 235, warm gas stream 244, and waste stream 224, respectively.

Pump 221 drives water 240, which comprises make-up water 239 and water 238 from condenser 223, sequentially through heat exchangers 245, 236 and 234 against expanded oxygen-depleted gas stream 214 emerging from gas turbine 293. In this embodiment, motor driven water 240 passes through a plurality of heat exchangers 245, 236 and 234, emerging as streams 255, 256 and 258 respectively. Feeding steam turbine 260 with steam 258 generates net power 259 to drive an electric generator or other devices needing power such as a compressor, as well as feed water pump 221. Condenser 223 converts steam 237 into water 238.

A portion of water 240, prior to entering heat exchanger 245, is diverted forming water stream 261 and heated through heat exchanger 217 against hot synthesis gas stream 220 to emerge through heat exchanger 217 as water stream 241. Further heating of water stream 241 in heat exchanger 216 against synthesis gas stream 213 emerges as steam 242.

Steam 242 is further heated in heat exchanger 211 against synthesis gas stream 219, emerging as superheated steam 231, which is the moderator for reaction with permeated oxygen and reactant 225 in permeate zone 299 of reactor 205. A portion of oxygen-containing gas stream 206 preferably is fed into combustor 208 to provide more oxygen-containing gas to the combustor.

In an alternative embodiment of FIG. 2, as shown in phantom and by dashed lines, intercooler 233 and compressor 207 are provided. Gas stream 251 enters intercooler 233 to cool the gas prior to entering compressor 207 to reduce compressor power. Compressor 207 is used to raise the pressure of combined gas stream 251. Intercooler 233 is optional. The gas emerging from gas compressor 207 enters heat exchanger 211.

The steam from the Rankine cycle may be recycled. A portion of steam 242, prior to entering heat exchanger 211, is separated into steam 267. Steam 267 is diverted for recycling and combining with stream 256 in the Rankine cycle. In this embodiment, a portion of steam 261 generated by water from the Rankine cycle and heated against synthesis gas product streams 218 and 220, is recycled further to generate power 259 through steam turbine 260.

Figure 3:
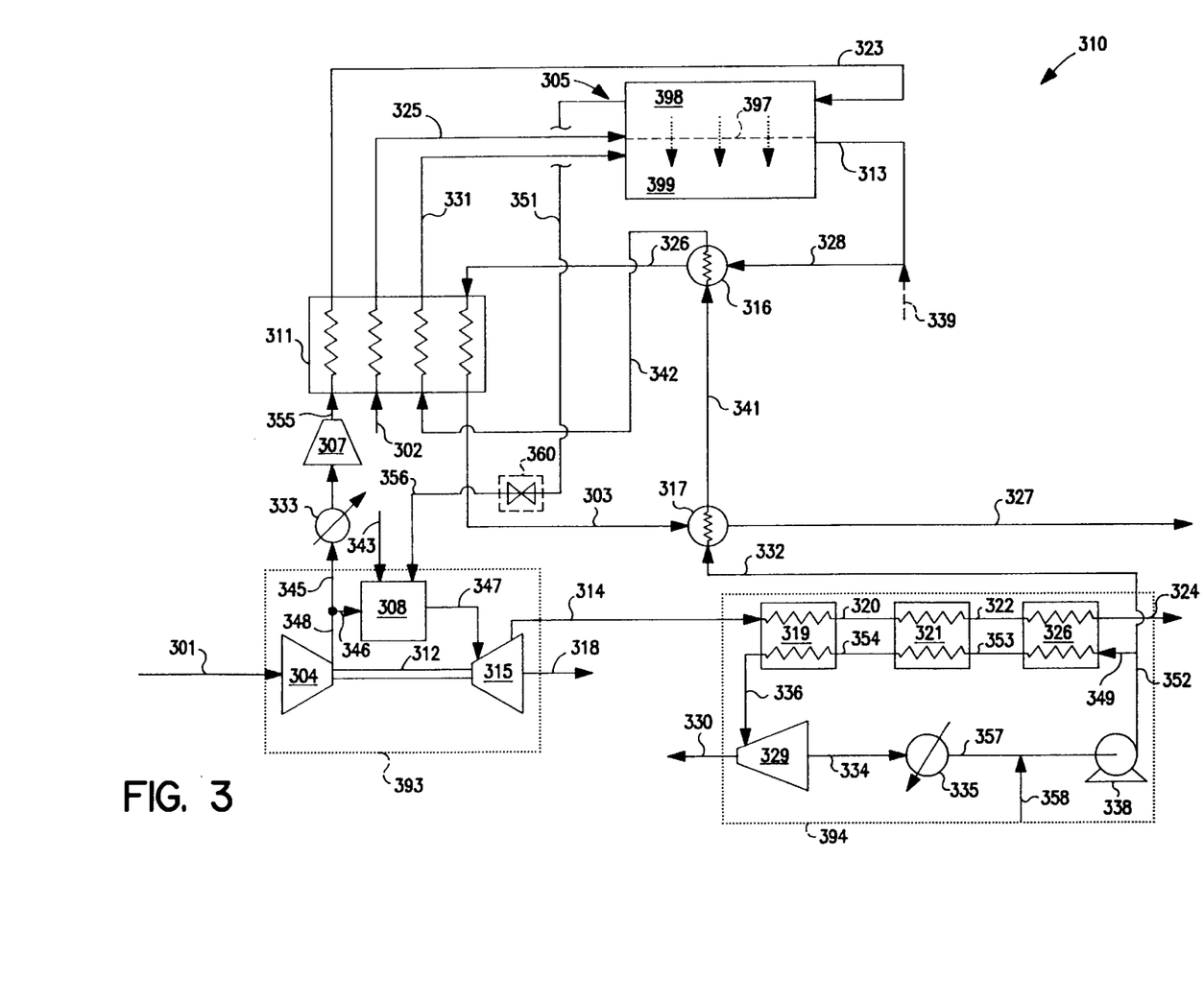
FIG. 3 is a schematic representation of a system similar to that of FIG. 2 wherein only a portion of the oxygen-containing gas is directed to the ion transport membrane in a countercurrent direction of flow against the reactant and moderator, and steam generated from the gas turbine exhaust is not recovered for use in the ion transport membrane as the moderator.

System 310, FIG. 3, presents a preferred embodiment for an ion transport membrane containing reactor which is integrated with a gas turbine for synthesis gas production and power generation according to the invention. In this embodiment, the oxygen-containing gas for use in the ion exchange reactor is fed into the reactor in a countercurrent direction of flow from that of the reactant and steam. The heat generated in the oxygen permeate zone of the reactor is sufficient to maintain the ion transport membrane at an adequately high temperature such that continued transport of the oxygen through the ion transport membrane is possible without raising the oxygen-containing gas to a high temperature before entry into the reactor. The required entry temperature depends upon the heat balance and heat transfer internal to the reactor, and the requirement that the membrane temperature has to be kept below about 1250° C. As a result, the oxygen-containing gas fed into the reactor does not require the compressed oxygen-containing gas to be raised to the temperature range of about 600° C. to about 900° C., as is the case where the gas is heated by a combustor; rather, the compressed oxygen-containing gas to be fed into the reactor only requires the gas stream to be in a temperature of above about 200° C. to 400° C., as by a recuperative conventional heat exchanger known to those skilled in the art. Alternately, the necessary heat transfer can be added internally to the reactor. It should be noted that at the start-up phase of a process employing the ion transport membrane, a gas feed having a sufficiently high temperature effective to start the reaction of oxygen permeating through the membrane capacity may be required. Once the reaction between the permeated oxygen with the reactant and the moderator has begun, the heat resulting therefrom generates a temperature sufficient to sustain continued reaction by the use of a compressed oxygen-containing gas and other materials of lower temperature such that the heated gas having high temperature from a combustion source would not be required.

In detail, this embodiment uses only a portion of the oxygen-containing gas stream 301, for feeding through ion transport membrane 397. As used herein, the amount of oxygen-containing gas stream directed to the ion transport membrane is generally a limitation of the machinery in the current state of the art. Currently, the gas turbine compressors available for use herein limit the air that can be extracted from the compressors to about 25%. The remaining portion of the gas is directed to combustor 308. As a result, compressed gas stream 348 is divided such that a portion 345 is directed to reactor 305, and another portion is directed to combustor 308 for driving gas turbine 315.

Oxygen-containing gas stream 345 is directed to intercooler 333 and booster compressor 307 forming oxygen-containing gas stream 355, which is subsequently heated with reactant 302 and moderator 331, preferably steam, all heated against synthesis gas stream 326 in heater 311. The resulting oxygen-containing gas stream 323 is then fed into retentate zone 398 of reactor 305 in a countercurrent direction of flow from reactant 325 and moderator 331. A portion of the oxygen-containing gas stream 323 is transported across ion transport membrane 397 resulting in a permeated oxygen gas, which is reacted with reactant 325 and moderator 331 introduced into permeate zone 399 of reactor 305. A partial oxidation (and steam reforming) reaction takes place within permeate zone 399 of reactor 305 between the permeated oxygen-containing gas, reactant 325 and moderator 331 to produced synthesis gas product 313 emerging from reactor 305.

Synthesis gas product 313 is at a high temperature as a result of the exothermic reactions in the permeate zone 399 of membrane 397 of reactor 305. The temperature must be kept below 1250° C. to avoid exceeding the temperature tolerance limit of the membrane material by the appropriate heat balance and heat transfer means within the reactor. The temperature of synthesis gas product 313 may be optionally lowered by quencher 339, preferably water, resulting in synthesis gas stream 328. Hot synthesis gas product 328 passes through a plurality of heat exchangers 316, 311 and 317, emerging therefrom each heat exchanger as cooler gas streams 326, 303 and 327 respectively.

Oxygen-depleted retentate gas stream 351 emerging from retentate zone 398 of reactor 305 is combined with fuel 343 to feed combustor 308. The fuel may be any convenient fuel, including hydrocarbons such as natural gas, a fuel oil or fuel gas generated from coal.

Portion of compressed oxygen-containing gas 348 not directed to reactor 305 is gas stream 346, which is fed to combustor 308, providing most of the oxygen for combustion and forming in combination with streams 343 and 346, resulting in oxygen-containing gas stream 347.

Expanded oxygen-depleted gas stream 314 is used to operate a Rankine power generation cycle. Hot gas stream 314 is subjected to a plurality of heat exchanging devices for lowering the temperature of the gas stream through each heat exchanger. Hot gas stream 314 emerges from gas turbine 315 and then passes through a plurality of heat exchangers 319, 321 and 326 to yield successively cooler waste streams 320, 322 and 324, respectively.

Water stream 352 separates partially into stream 332 for use as moderator in reactor 305, and stream 349 to drive steam turbine 329. Water stream 349 is heated against the flow of gas stream 314 through heat exchangers 326, 321 and 319 to yield successively hotter steams 353, 354 and 336. Steam turbine 329 operates to produce net power 330 from steam 336. Steam 334 is condensed into water by condenser 335 emerging as condensed water 357, which combines with make-up water 358. A pump 338 draws condensed water 357 and makeup water 358 together forming water 352 for recycling.

Beside providing water, as a steam source for steam turbine 329, stream 352 splits into stream 332, which is heated through a plurality of heat exchangers 317, 316 and 311, as discussed above, to yield stream 331 as the moderator for reaction in reactor 305.

As an alternative embodiment, water stream 332 from the Rankine cycle is not provided as a moderator for synthesis gas production in reactor 305. Rather, water stream 332 is derived from a source independent from the Rankine cycle.

There is also provided as an alternative embodiment control valve 360 for regulating the flow of oxygen-depleted retentate gas stream 351 emerging from reactor 305 for feeding combustor 308.

Figure 4:
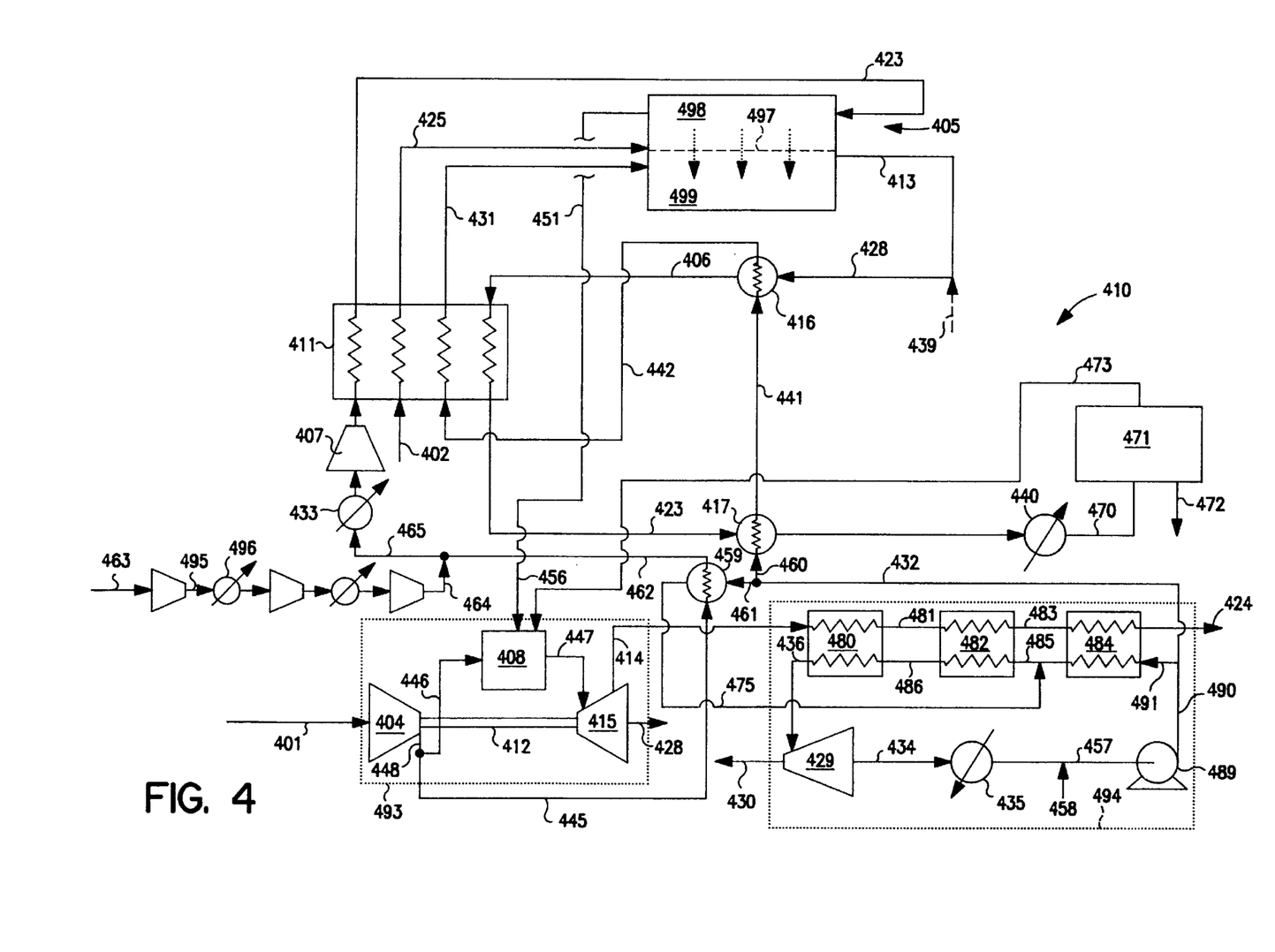
FIG. 4 is a schematic representation of another system according to the present invention wherein the permeate product enters an acid gas unit for purifying the resulting synthesis gas from sulfur and other impurities, the exhaust from the gasification combined cycle unit passes to the gas turbine combustor, and supplemental oxygen-containing gas and supplemental air compression/intercooling units are used.

FIG. 4 provides System 410, which is directed to an ion transport membrane containing reactor integrated with a gas turbine for producing an oxidized product and power generation, and further combined with a gasification apparatus. This embodiment illustrates a further efficient use of the ion transport membrane in combination with a power generating apparatus. In this embodiment, as in System 310, FIG. 3, the compressed oxygen-containing gas for use in the ion exchange reactor is fed into the ion transport reactor in a direction of flow countercurrent to the flow of the reactant and steam. The heat generated in the oxygen permeate zone of the reactor is sufficiently high to maintain temperatures that assure continued transport of the oxygen through the ion transport membrane without raising the oxygen-containing gas to a high temperature before entry of the gas into the reactor. In general there will be sufficient internal heat generation due to the partial oxidation reaction in reactor 405 so that oxygen-containing gas 425 does not have to be above 650° C. This eliminates the need for an additional combustor in stream 423.

Oxygen-containing gas 401 is fed into air compressor 404, emerging as compressed oxygen-containing gas 448, which is divided into gas stream 446 for feeding in combustor 408, and gas stream 445 for feeding ion transport membrane reactor 405.

Compressed oxygen-containing gas stream 445 is cooled in heat exchanger 459 against water stream 461, emerging as gas stream 462. Supplemental oxygen-containing gas stream 463 passes through a plurality of compressor stages 495 and intercoolers 496, to yield compressed and intercooled oxygen-containing gas stream 464. Gas streams 462 and 464 combine to form compressed, intercooled oxygen-containing gas stream 465, which then passes through intercooler 433, compressor 407 and heat exchanger 411 (against oxidized product stream 406) to emerge as compressed, combusted oxygen-containing gas stream 423 for feeding reactor 405.

Compressed, combusted oxygen-containing gas stream 423 is passed into retentate zone 498 of reactor 405 for oxygen to be transported across ion transport membrane 497 to permeate zone 499 of reactor 405. Reactant 402 passes through heat exchanger 411 against stream 406, emerging as reactant 425, along with moderator 431 (steam), also emerging from heat exchanger 411 against stream 406, are fed into permeate zone 499 of reactor 405 on the opposite side and direction of flow from compressed, oxygen-containing gas stream 423. Reactant 425 and moderator 431 react with the permeated oxygen by a partial oxidation reaction, and synthesis gas 413 emerges from reactor 405 therefrom.

The temperature of the oxidized product stream 413 may optionally be lowered by combining with a quencher 439, preferably water, resulting as synthesis stream 428. Oxidized product stream 428 may then pass through a plurality of heat exchangers 416, 411 and 417 to yield successively cooler synthesis gas streams 406, 423 and 427. Oxidized product stream 427 may then pass through cooler 440, emerging as oxidized product 470.

Acid gas removal apparatus 471 removes a stream of gas 472 containing sulfur and other impurities from oxidized product stream 470 for further treatment, i.e., sulfur recovery. Sulfur-free synthesis gas 473 emerges from acid gas removal apparatus 471 and is used as fuel and combined with oxygen-depleted gas stream 451, and oxygen-containing stream 446 in combustor 408 for driving expansion turbine 415.

Gas 447 emerging from combustor 408 passes through turbine 415 to generate power 418, and to drive compressor 404 by shaft 412.

Gas stream 414 emerges from gas turbine 415 and enters into a Rankine power generation cycle. Gas stream 414 passes through a plurality of heat exchangers 480, 482 and 484 in the Rankine cycle to yield successively cooler waste gas streams 481, 483 and 424. A portion 491 of water 490 is fed into heat exchangers 484, 482 and 480 against the flow of gas streams 414, 481 and 483 to yield successively hotter streams 485, 486 and 436. Resulting superheated steam 436 feeds into steam turbine 429 to generate power 430. Condenser 435 condenses water vapor 434 to water 457. Pump 489 draws water 457 forming water 490 to be recycled for use in the steam turbine 429, or alternatively, to be used as water 432 for eventual conversion into steam moderator 431. A portion of water stream 432 may also be divided to form water stream 461, which then passes through heat exchanger 459 to emerge as hot water stream 475. Hot water stream 475 can be recycled and combined with hot water stream 485 before passing through heat exchanger 482 to emerge as steam 436 for feeding steam turbine 429.

Figure 5:
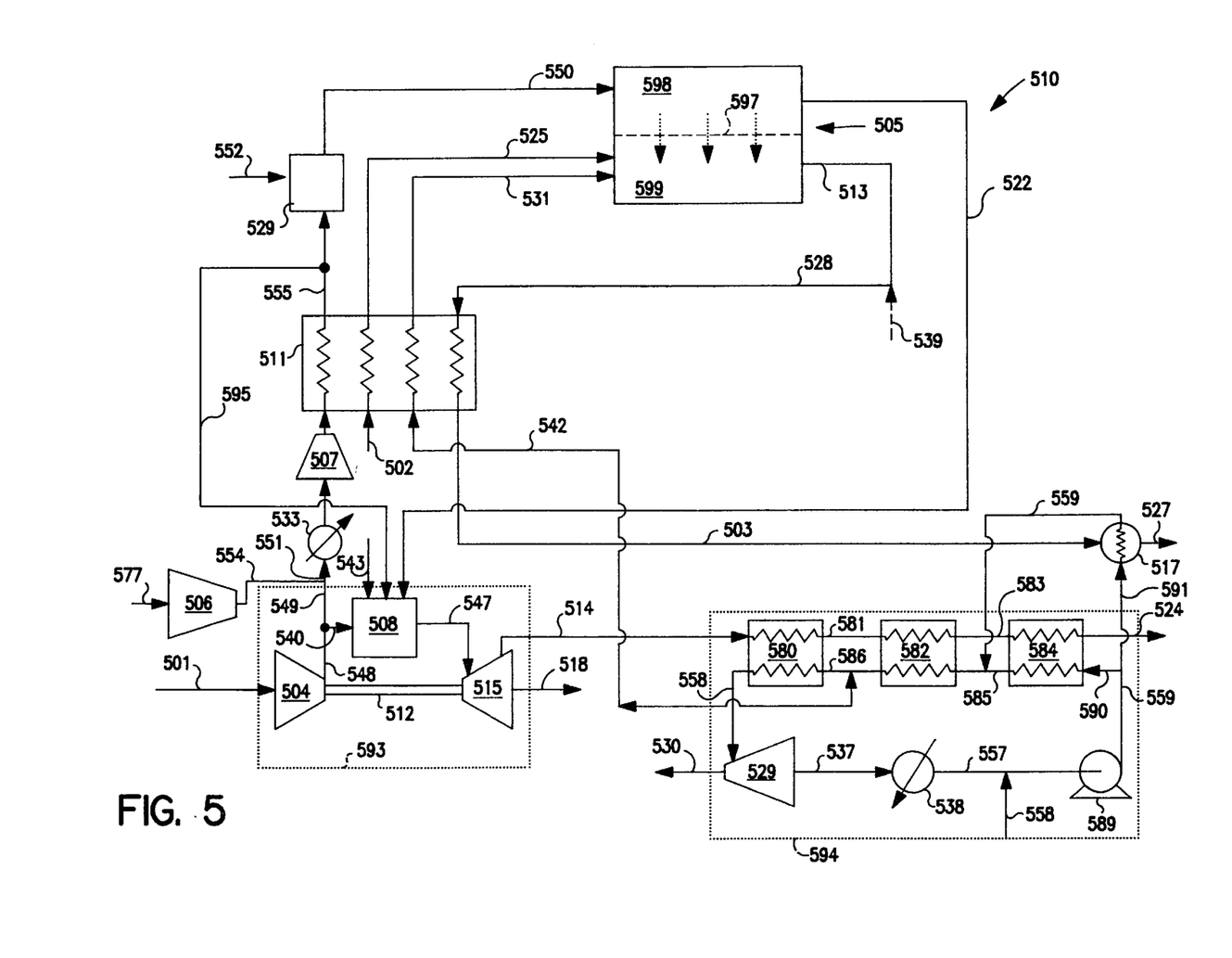
FIG. 5 is a schematic representation of a system according to this invention wherein the oxygen-containing gas is directed to the ion transport membrane in a countercurrent direction of flow against the reactant and the moderator and a portion of the oxygen-containing gas is used to cool the product gas and supplemental oxygen-containing gas is used.

System 510 in FIG. 5 provides an embodiment wherein oxygen-containing gas is fed into an ion transport membrane reactor in the same direction of flow as the reactant and steam. The emerging synthesis gas product is maintained at a lower temperature by the heat sink provided by air. This oxygen-containing feed is used to cool product stream when carbon dioxide is used as a optional moderator.

Oxygen-containing gas 501 is fed into compressor 504 emerging as compressed oxygen-containing gas stream 548, which splits into gas stream 540 for feeding combustor 508 and as gas stream 549 directed to intercooler 533. Supplemental oxygen-containing gas 577 passes through compressor 506 to emerge as supplemental compressed, oxygen-containing gas stream 554. Gas stream 554 combines with gas stream 549, forming compressed, oxygen-containing gas stream 551, which passes successively through intercooler 533, compressor 507 and heat exchanger 511 to emerge as heated, compressed oxygen-containing gas stream 555.

Stream 555 is larger than that needed to provide oxidant in reactor 505. Therefore, a portion of this gas stream may be diverted to the gas turbine combustor.

Fuel 552 is added to optional combustor 529 wherein preheated, compressed oxygen-containing gas 555 is combusted, emerging as combusted, oxygen-containing gas 550 for feeding into retentate zone 598 of reactor 505. The direction of flow of the compressed, combusted oxygen-containing gas 550 is in a concurrent direction of flow with reactant 525 and moderator 531, which are fed into permeate zone 599 of reactor 505. Oxygen from compressed, combusted oxygen-containing gas stream 550 is transported through the ion transport membrane 597, resulting in transported oxygen in permeate zone 599. The transported oxygen then reacts by partial oxidation with reactant 525 and moderator 531 to emerge from permeate zone 599 of reactor 505 as synthesis gas 513. Optionally, quencher 539, preferably water, may be added to synthesis gas 513, resulting in synthesis gas stream 528, to lower the temperature thereof prior to emerging as synthesis gas 528. The quenched synthesis gas passes through heat exchanger 511, and emerging therefrom as synthesis gas stream 503. Air is used to lower the temperature of synthesis gas stream 503. Heat exchanging device 517 may be used to further lower the temperature of synthesis product stream 503, to emerge as crude synthesis gas product 527.

Reactant 502 is passed through heat exchanger 511 emerging as heated reactant 525. Water stream 542 from a Rankine steam generation cycle is used as the moderator and is also heated in heat exchanger 511, emerging as water stream 531. As noted above, both reactant 525 and moderator 531 enter through permeate zone 599 of reactor 505.

Emerging from retentate zone 598 of reactor 505 is compressed, combusted oxygen-depleted retentate gas stream 522, which together with heated, compressed oxygen-containing gas stream 555 and fuel 543, are passed to gas turbine combustor 508 as noted above. Emerging therefrom is a combusted gas stream for driving gas turbine 515. Expansion turbine 515 is linked to compressor 504 by shaft 512, which drives compressor 504, and generates power 518. Combusted oxygen-containing gas stream 547 emerges from combustor 508 and feeds expansion turbine 515, to emerge as gas stream 514.

A Rankine power generation cycle is employed to utilize hot gas stream 514. Gas stream 514 is fed into a plurality of heat exchangers 580, 582 and 584 in the Rankine cycle to emerge successively as cooler waste gas streams 581, 583 and 524. Water 590 is fed into heat exchangers 584, 582 and 580 against the flow of and heated against gas streams 583, 581 and 514 to yield successively hotter streams 585, 586 and steam 558, which is fed into steam turbine 529. Operation of steam turbine 529 generates power 530, and results in stream 537. Condenser 535 may be used to condense water vapor in stream 537 to water 557. Pump 589 facilitates makeup water 558 to combine with water 557, forming water 559. An optional means for heating water 559 for use in steam turbine 529 is effected by diverting a portion 591 of which through heat exchanger 517 against synthesis gas stream 503 before combining heated water 559 with water stream 585 emerging from heat exchanger 584.

A portion of saturated steam 586 that emerges from heat exchanger 582 is split into stream 542 for use as moderator for reactor 505. As noted above, stream 542 is heated in heat exchanger 511, emerging as superheated steam 531 prior to entering reactor 505.

Figure 6:
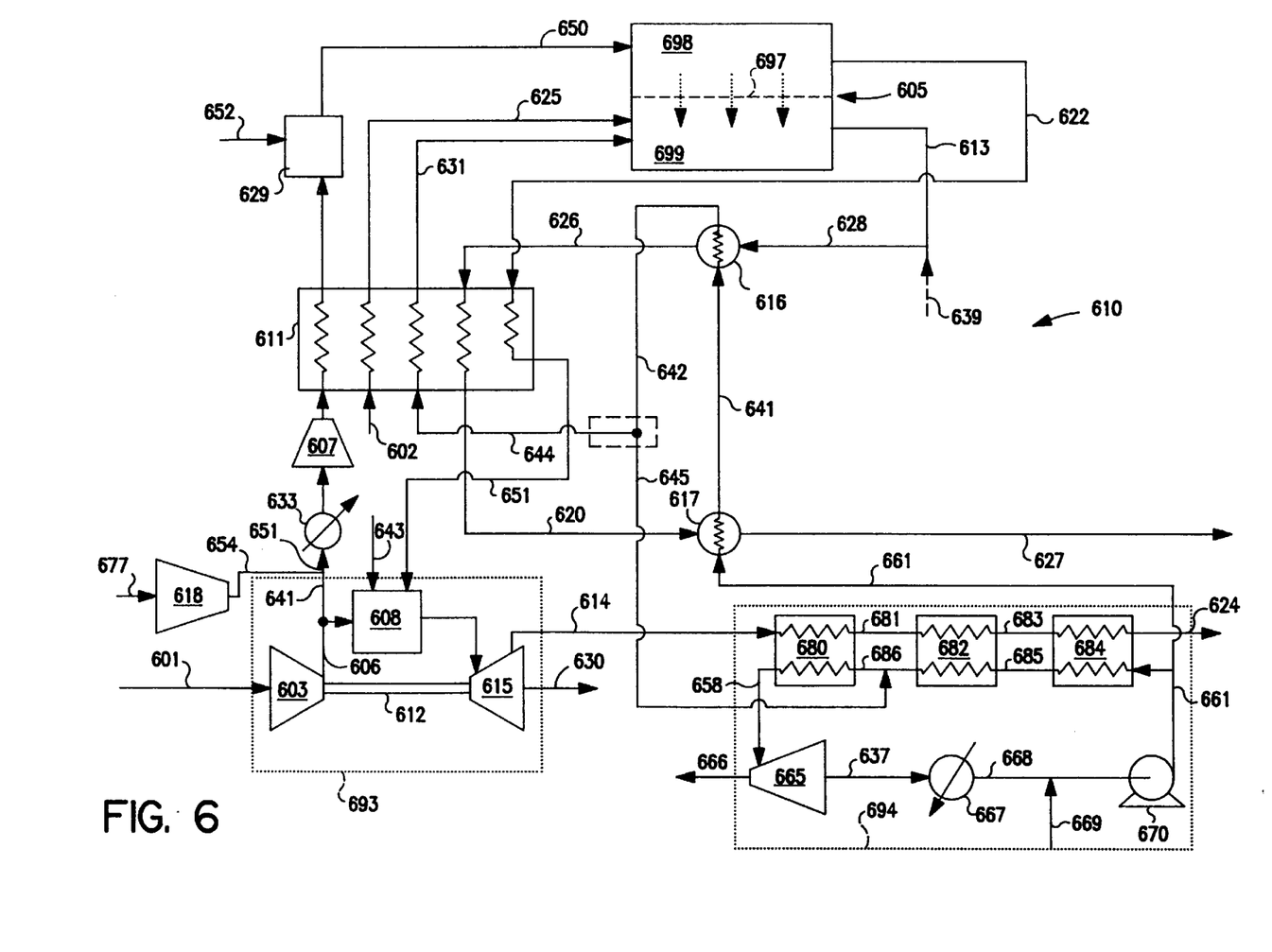
FIG. 6 is a schematic representation of yet another system wherein the oxygen-depleted retentate gas is partially cooled by heat exchange before feeding to the gas cycle and wherein supplemental oxygen-containing gas is used.

System 610, as schematically presented in FIG. 6, provides an alternative embodiment to System 210 of FIG. 2. In this embodiment, the oxygen-depleted retentate gas from the reactor is partially cooled before entering a gas cycle.

Oxygen-containing gas 601 passes through compressor 603, resulting in compressed oxygen-containing gas 606. Supplemental oxygen-containing gas 677 is passed through compressor 618, emerging as supplemental compressed oxygen-containing gas 654. A portion of compressed oxygen-containing gas stream 606 combines with compressed, oxygen-containing gas stream 654 forming compressed, oxygen-containing gas stream 651. Compressed oxygen-containing gas stream 651 is treated successively in intercooler 633, compressor 607, and heat exchanger 611 prior to passing through combustor 629, emerging as compressed, combusted, oxygen-containing gas 650. A combustor fuel 652, such as any convenient fuel, including hydrocarbons like natural gas, fuel oils or fuel gas generated from coal, can be used to feed combustor 629.

The temperature of reactant 602 is raised by heat exchanger 611, forming reactant 625. Steam 644 is also treated in heat exchanger 611, forming steam 631.

Compressed, combusted oxygen-containing gas stream 650 is fed into retentate zone 698 of reactor 605, resulting in oxygen permeated through ion transport membrane 697 into permeate zone 699. The introduction of reactant 625 and moderator 631 into permeate zone 699 of reactor 605 promotes partial oxidation in permeate zone 699 of reactor 605, emerging as synthesis gas stream 613 therefrom.

The temperature of the synthesis gas 613 may be optionally lowered by addition of quencher 639, such as water, wherein synthesis gas 628 emerges therefrom. The temperature of synthesis gas 628 is lowered by passing successively through heat exchangers 616, 611 and 617, emerging therefrom in sequential order cooler synthesis gas streams 626, 620 and 627 as the crude synthesis gas product.

Oxygen-depleted gas stream 622 emerges from retentate zone 698 of reactor 605, and passes through heat exchanger 611 and emerges as cooler oxygen-retentate gas stream 651.

Synthesis gas 628 transfers heat to water stream both for use in reactor 605 as well as for recycling in the Rankine power generation cycle. Water 661 that emerges from the Rankine cycle passes through heat exchangers 617 and 616, emerging therefrom successively hotter water streams 641 and steam 642. Steam 642 is divided into steam 644 and 645. Steam 644 is further heated in heat exchanger 611, emerging as superheated steam 631. Alternatively, steam 645 is recycled into the Rankine cycle to combine with steam 686.

Gas stream 622 that has been-fed through heater 611 emerges as cooler gas stream 651. Fuel 643, which may be any convenient fuel, including hydrocarbons, such as natural gas, fuel oils or gas generated from coal, and gas stream 651, and a portion 691 of stream 606 are used to generate heat in combustor 608. Gas stream 647 passes through expansion turbine 615 to drive air compressor 603 by shaft 612, and to generate power 630. Emerging from gas turbine 615 is expanded oxygen-containing gas 614.

A Rankine power generation cycle uses gas stream 614 from gas turbine 615. Gas stream 614 is fed through a plurality of heat exchangers 680, 682 and 684, emerging successively therefrom as cooler waste streams 681, 683 and 624. A portion of water 661 is fed into the Rankine cycle heat exchange devices against streams 681, 683 and 624 in heat exchangers 684, 682 and 680, emerging successively therefrom as hotter water stream 685 and steam 686 and superheated steam 658, respectively. As noted above, steam 645 recycled from the Rankine cycle and indirectly heated by synthesis gas 628 and 620 is combined with steam 686.

Steam 658 emerging from heat exchanger 680 drives steam turbine 665, resulting in power 666 and stream 637. Condenser 667 condenses water vapor 637 into water 668, which combines with makeup water 669 to form water 661. Pump 670 pressurizes water streams 668 and 669 into water stream 661 within the Rankine cycle.

An alternative embodiment is the independent source of moderator 644. Here, water stream 642 is not divided. Rather, water streams 642 and 645 are the same stream and are recycled into the Rankine cycle. Moderator 644, which may be water, carbon dioxide, argon or another type of moderator known to the skilled artisan, comes from a source other than that of System 610, and passed through heat exchanger 611 prior to entering permeate zone 699 of reactor 605.

Figure 7:
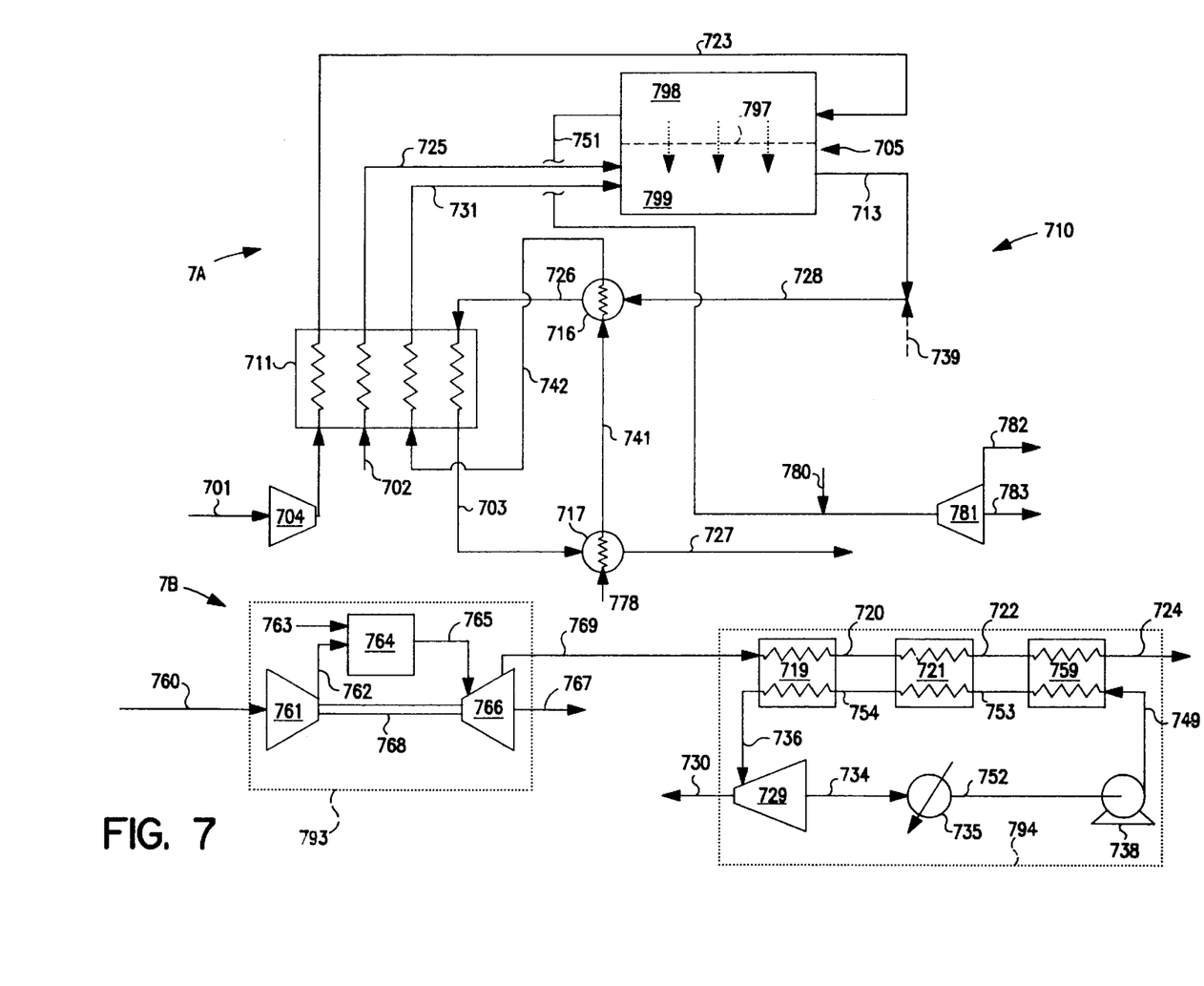
FIGS. 7a and 7b are schematic representations of a comparative system for producing synthesis gas and an independent gas cycle for generating power, respectively.

A comparison of two operating systems demonstrating some of the advantages of this invention is provided by the embodiment of FIGS. 3 (in its alternative embodiment) and 7.

The embodiment of system 710, FIGS. 7a and 7b, is compared to that of the alternative embodiment of System 310, FIG. 3. System 710 provides an example wherein heat resulting from the ion transport membrane reactor is not integrated with a gas turbine and power generation devices. Consequently, FIG. 7a provides a schematic representation of the process of the ion transport membrane reactor, and FIG. 7b provides a schematic representation of a gas cycle and a steam cycle, both independent from the ion transport membrane reactor. The system includes a gas turbine, Brayton cycle 793, and the Rankine cycle 794 includes a stream turbine. The advantages of the present invention, wherein the ion transport membrane reactor is integrated with gas cycle and steam cycle power generation, will be apparent by the comparison of the reduction in energy requirement and capital cost associated with the present invention.

In system 710, oxygen-containing gas for use in ion exchange reactor 705 is fed in a countercurrent direction of flow opposite the flow of the reactant 725 and moderator 731. The heat generated in permeate zone 799 of reactor 705 is at a sufficiently high temperature such that continued transport of the oxygen through ion transport membrane 797 is available without combusting the oxygen-containing gas before subjecting the gas into the reactor 705.

In FIG. 7a, oxygen-containing gas stream 701 is directed to the ion transport membrane 798. Gas stream 701 passes through compressor 704 and heat exchanger 711 to emerge as compressed, heated oxygen-containing gas 723, which is fed into retentate zone 799 of reactor 705 in a countercurrent direction of flow from reactant stream 725 and moderator (steam) stream 731. Both reactant stream 725 and steam 731 are fed into permeate zone 799 of reactor 705.

Oxygen permeated through ion transport membrane 797 in permeate zone 799 of reactor 705 is reacted with reactant 725 and steam 731. Partial oxidation reaction occurs resulting in synthesis gas 713, which emerges from permeate zone 799 of reactor 705. The temperature of synthesis gas 713 may be optionally lowered by a quencher 739, preferably water, thereby forming synthesis gas stream 728.

The resulting synthesis gas stream 728 passes through a plurality of heat exchangers 716, 711 and 717, to yield successively cooler synthesis gas streams 726, 703 and crude synthesis gas product 727.

Water 728 passes through a plurality of heat exchangers 717, 716 and 711 to yield successively hotter water 741, and steam 742 and superheated steam 731. Reactant gas stream 702 is heated in heat exchanger 711, emerging as heated reactant 725.

Oxygen-depleted retentate gas stream 751 emerging from retentate zone 798 of reactor 705 may optionally be cooled by a quencher 780, preferably a water stream, prior to passing through expander 781, thereby producing stream 782 and power 783.

Separately, in FIG. 7b, oxygen-containing gas 760 is compressed in compressor 761. Compressed oxygen-containing gas 762 emerging-therefrom and passes through combustor 764. Fuel 763 is combusted in combustor 764, and compressed, combusted oxygen-containing gas 765 emerges therefrom. Gas stream 765 passes into expansion turbine 766, producing power 767 and drives air compressor 761 via shaft 768.

Gas stream 769 emerging from gas turbine 766 is used to operate a Rankine power generation cycle. Hot gas stream 769 is subjected to a plurality of heat exchangers 719, 721 and 759 to produce successively cooler waste streams 720, 722 and 724, emerging from the heat exchangers, respectively.

Water stream 749 is fed into the plurality of heat exchangers 759, 721 and 719 in the Rankine power generation cycle, such that successively hot water 753 and steam 754 and superheated steam 736 emerge from the heat exchangers respectively. Steam 736 is used to drive steam turbine 729, generating power 730 and water vapor 734. Condenser 735 condenses water vapor 734 into water 752 for recycling through the plurality of heat exchangers by motorized means 738.

Table 1 provides a summary of the power generation by synthesis gas production using the ion transport membrane. This table provides a comparison of the integrated and non-integrated power cycle and partial oxidation through an ion transport membrane reactor.

TABLE 1

Comparison of integrated and non-integrated power cycle and partial oxidation through ion transport membrane reactor

| Base Case: | | Present Invention: | |
|---|---|---|---|
| Non-integration of power generation by gas based synthesis gas by partial oxidation | | Integration of power cycle and steam reforming through an ion transport membrane reactor | |
| Power plant: | | | |
| Fuel (natural gas in lb-mol/h) | 505.66 | Fuel (natural gas in lb-mol/h) | 473.9 |
| Total btu/h in fuel | 203,902,017 | Total btu/h in fuel, | 191,095,135 |
| GT simulation, hp | 54,384 | Fuel (POx) in lb-mol/h | 1,000 |
| GT power (×0.98), kW | 39,759 | Total btu/h in fuel | 403,239,365 |
| GT comp., hp | 26,645 | GT simulation, hp | 57,833 |
| GT comp., kW | 19,877 | GT power (×0.98), kW | 42,281 |
| Water pump, hp | 55 | GT comp., hp | 29,776 |
| Water pump, kW | 41 | GT comp., kW | 22,213 |
| ST at 85% eff. | 10,021 | Booster comp., hp | 325 |
| Net power from ST | 7139 | Booster comp., kW | 242 |
| Net power from power cycle, kW | 27,921 | Water pump, hp | 57 |
| | | Water pump, kW | 43 |
| Ion Transport Membrane/POx: | 1,000 | ST at 85% eff. | 10,532 |
| Fuel (natural gas in lb-mol/h) | | New power from ST | 7,511 |
| Total btu/h in fuel | 403,239,365 | Total power, kW | 27,336 |

TABLE 1-continued

Comparison of integrated and non-integrated power cycle and partial oxidation through ion transport membrane reactor

| Base Case: | | Present Invention: | |
|---|---|---|---|
| Air compressor, hp | 7,708 | | |
| Air comp., kW | 5,750 | Heat Rate, but/kwh (based on fuel used in power cycle only) | 6,991 |
| Expander, hp | 7,654.8 | | |
| Expander, kW | 5,596 | | |
| Steam Cycle, kW | 0 | Heat Rate, but/kwh (based on fuel used in power cycle and POx) | 21,742 |
| Net power | −154 | | |
| Total Power, kW | 26,867 | | |
| Heat Rate, but/kwh (based on fuel used in power cycle only) | 7,589 | | |
| Heat Rate, but/kwh (based on fuel used in power cycle and POx) | 22,598 | | |
| Higher Revenues at 5 c/kWh, $/yr | 187,706 | | |
| Fuel Savings, $/yr | 224,987 | | |
| Capital Savings in compressor and expander | 2,000,000 | | |

Basis:

Operation - 8,000 h/yr
Fuel - natural gas (HHV) at $2.20/MMbtu

Comparing the summary for the integration of power cycle and partial oxidation through the ion transport membrane separators, the integrated system of the present invention clearly provides an economic advantage over the non-integrated system. In the alternative embodiment of System 310 and in System 710, the same amount of synthesis gas is produced from 1,000 lb-mol/h of natural gas. However, in the integrated process of the present invention, more power is produced because of better heat integration. As a result, net power produced from an integrated process is 27,336 kW compared to 26,867 kW in base (non-integrated) case. For equal power output from gas turbines in the two embodiments, the integrated process uses about 6% less fuel. Based on the conventional operation of 8000 hrs/yr, and the cost of natural gas (HHV) at $2.20/MMbtu, the integrated system of the present invention can expect significantly higher revenues of about $188,000 annually at 5 c/kWh, as well as a fuel saving cost of $225,000 annually. Additionally, the one time capital savings for the elimination of separate use of compressor and expander for synthesis gas production amounts to about $2,000,000.

Existing gas turbine power generating systems may be retrofitted with an ion transport system according to the present invention. These systems may include those available from General Electric Co., Schenectady, N.Y., Siemens, Germany, or ABB, Sweden. Modifications to these gas turbine systems are minimal, including addition of a gas stream feed to the ion transport stage and a ion transport exhaust feed to a combustor that provides gas for the expansion turbine.

The ion transport membranes employed herein are constructed of dense, ceramic oxides or mixtures of oxides, characterized by oxygen vacancies in their crystal lattice caused by defects or the introduction of dopants (such as, Y, Sr, Ba, Ca and the like). A vacancy diffusion mechanism is the means by which oxygen ions are transported through the crystal lattice. In general, elevated temperatures (400° C. to 1250° C., such as within the range of from about 500° C. to about 1200° C., preferably within the range of about 900° C. to about 1100° C.) should be maintained during operation to achieve high mobilities of the vacancies. Large vacancy concentrations combined with high mobilities of the vacancies form the basis for rapid oxygen ion transport through the materials from which the ion transport membranes are constructed. Since only oxygen ions may occupy the crystal lattice, the ideal ion transport membranes possess infinite oxygen selectivity.

The ion transport membranes suitable for use herein may be constructed from materials that are mixed conductors and which do not require an external circuit to facilitate electron movement. Examples include dual-phase membranes. Uses of different combinations of ion transport membranes are disclosed in U.S. Ser. No. 08/444,354, filed May 18, 1995, entitled "Pressure Driven Solid Electrolyte Membrane Gas Separation Method", which is incorporated herein by reference.

Different types of ion transport materials may be employed keeping with the spirit of the present invention. For instance, the ion transport membrane may be comprised of a material that is primarily an oxygen ion conductor, such as yttria-stabilized zirconia ("YSZ"), sandwiched between two porous electrodes. In practice, oxygen molecules diffuse through one of the porous electrodes to the electrolyte surface, at which point dissociation into oxygen ions occurs. That first porous electrode provides electrons for the process. The oxygen ions diffuse through the electrolyte and reach the second porous electrode, where recombination occurs thereby forming oxygen molecules and releasing electrons in the process. The electrons are returned to the first porous electrode for oxygen ionization by an external circuit.

As an alternative, the ion transport membrane used in this invention may be comprised of a material that conducts both oxygen ions and electrons. Such materials are often referred to as mixed conductors. For mixed-conductor ion transport membranes, electrons are returned to the high oxygen partial pressure side of the ion transport membrane by electronic conduction through the ion transport membrane itself thereby obviating the need for an external circuit.

Ion transport membranes themselves are not to date believed to be commercially available. However, materials used to prepare ion transport membranes are obtainable from Praxair Specialty Chemicals, Woodinville, Wash., for example.

The commercially available materials used to prepare ion transport membranes may be fabricated by conventional techniques, such as extrusion, slip coating, calendaring, dip coating, spin coating and the like into thick self-supporting films, thin films supported on a suitable porous substrate, in disk-like and tubular configurations. The thickness of the ion transport membrane should be below about 5000 μm, with below about 500 μm being preferred and below about 50 μm being more preferred. If the film thickness is large e.g., above about 1000 μm), the ion transport membrane may be self-supporting.

Alternatively, the ion transport membranes may be in the form of a thin film, which may be supported on a porous support, having a thickness within the range of from about 500 μm to about 5000 μm. Such porous substrates may be constructed of the same material or of different materials than the ion transport membrane itself. The mixed-conductor-type ion transport membranes may be prepared from a variety of materials including those listed in Table 2 below. In Table 2, δ is the deviation from oxygen stoichiometry. In addition, the x and y values may vary with material composition.

TABLE 2

Mixed Conducting Solid Electrolytes

Material composition

1. $(La_{1-x}Sr_x)(Co_{1-y}Fe_y)O_{3-\delta}$ ($0 \leq x \leq 1$, $0 \leq y \leq 1$, δ from stoichiometry)
2. $SrMnO_{3-\delta}$
   $SrMn_{1-x}Co_xO_{3-\delta}$ ($0 \leq x \leq 1$, $0 \leq y \leq 1$, δ from stoichiometry)
   $Sr_{1-x}Na_xMnO_{3-\delta}$
3. $BaFe_{0.5}Co_{0.5}YO_3$
   $SrCeO_3$
   $YBa_2Cu_3O_{7-\beta}$ ($0 \leq \beta \leq 1$, β from stoichiometry)
4. $La_{0.2}Ba_{0.8}Co_{0.8}Fe_{0.2}O_{2.6}$; $Pr_{0.2}Ba_{0.8}Co_{0.8}Fe_{0.2}O_{2.6}$
5. $A_xA'_{x'}A''_{x''}B_yB'_{y'}B''_{y''}O_{3-z}$ (x,x',x'',y,y',y'' all in 0–1 range)
   where: A,A',A'' = from groups 1, 2, 3 and f-block lanthanides
   B,B',B'' = from d-block transition metals
6. (a) Co—La—Bi type: Cobalt oxide 15–75 mole %
   Lanthanum oxide 13–45 mole %
   Bismuth oxide 17–50 mole %
   (b) Co—Sr—Ce type: Cobalt oxide 15–40 mole %
   Strontium oxide 40–55 mole %
   Cerium oxide 15–40 mole %
   (c) Co—Sr—Bi type: Cobalt oxide 10–40 mole %
   Strontium oxide 5–50 mole %
   Bismuth oxide 35–70 mole %
   (d) Co—La—Ce type: Cobalt oxide 10–40 mole %
   Lanthanum oxide 10–40 mole %
   Cerium oxide 30–70 mole %
   (e) Co—La—Sr—Bi type:
   Cobalt oxide 15–70 mole %
   Lanthanum oxide 1–40 mole %
   Strontium oxide 1–40 mole %
   Bismuth oxide 25–50 mole %
   (f) Co—La—Sr—Ce type:
   Cobalt oxide 10–40 mole %
   Lanthanum oxide 1–35 mole %
   Strontium oxide 1–35 mole %
   Cerium oxide 30–70 mole %
7. $Bi_{2-x-y}M'_xM_yO_{3-\delta}$ ($0 \leq x \leq 1$, $0 \leq y \leq 1$, δ from stoichiometry)
   where: M' = Er, Y, Tm, Yb, Th, Lu, Nd, Sm, Dy, Sr, Hf, Th, Ta, Nb, Pb, Sn, In, Ca, Sr, La and mixtures thereof
   M = Mn Fe, Co, Ni, Cu and mixtures thereof
8. $BaCe_{1-x}Gd_xO_{3-x/2}$ where x equals from zero to about 1.
9. One of the materials of $A_sA'_tB_uB'_vB''_wO_x$ family whose composition is TABLE 2-continued Mixed Conducting Solid Electrolytes Material composition disclosed in U.S. Pat. No. 5,306,411 (Mazanec et al.) as follows:
A represents a lanthanide or Y, or a mixture thereof;
A' represents an alkaline earth metal or a mixture thereof;
B represents Fe;
B' represents Cr or Ti, or a mixture thereof;
B'' represents Mn, Co, V, Ni or Cu, or a mixture thereof;
and s, t, u, v, w, and x are numbers such that:
s/t equals from about 0.01 to about 100;
u equals from about 0.01 to about 1;
v equals from zero to about 1;
w equals from zero to about 1;
x equals a number that satisfies the valences of the A, A', B, B', B''
in the formula; and $0.9 < (s + t)/(u + v + w) < 1.1$ 10. One of the materials of $La_{1-x}Sr_xCu_{1-y}M_yO_{3-\delta}$ family, where:
M represents Fe or Co;
x equals from zero to about 1;
y equals from zero to about 1;
δ equals a number that satisfies the valences of La, Sr, Cu, and M in the formula.

11. One of the materials of $Ce_{1-x}A_xO_{2-\delta}$ family, where:
A represents a lanthanide, Ru, or Y; or a mixture thereof;
x equals from zero to about 1;
y equals from zero to about 1;
δ equals a number that satisfies the valences of Ce and A in the formula.

12. One of the materials of $Sr_{1-x}Bi_xFeO_{3-\delta}$ family, where:
A represents a lanthanide or Y, or a mixture thereof;
x equals from zero to about 1;
y equals from zero to about 1;
δ equals a number that satisfies the valences of Ce and A in the formula.

13. One of the materials of $Sr_xFe_yCo_zO_w$ family, where:
x equals from zero to about 1;
y equals from zero to about 1;
z equals from zero to about 1;
w equals a number that satisfies the valences of Sr, Fe and Co in the formula.

14. Dual phase mixed couductors (electronic/ionic):

$(Pd)_{0.5}/(YSZ)_{0.5}$
$(Pt)_{0.5}/(YSZ)_{0.5}$
$(B—MgLaCrO_x)_{0.5}(YSZ)_{0.5}$
$(In_{90\%}Pt_{10\%})_{0.6}/(YSZ)_{0.5}$
$(In_{90\%}Pt_{10\%})_{0.5}/(YSZ)_{0.5}$
$(In_{95\%}Pr_{2.3\%}Zr_{2.5\%})_{0.5}/(YSZ)_{0.5}$
Any of the materials described in 1–13,
to which a high temperature
metallic phase (e.g., Pd, Pt, Ag, Au, Ti, Ta, W) is added.

Mixed electronic/ionic conductors of item 14 in Table 2 are dual phase mixed conductors that are comprised of physical mixtures of an ionically-conducting phase and an electronically-conducting phase. For the reducing application at the anode, the chromium containing mixed conductor material is preferred because of better stability at low oxygen partial pressure.

Electrically driven ion transport membranes based on ionic conductors may be selected from the following materials in Table 3:

TABLE 3

Ionic Conductor Ion Transport Materials

15. $(Bi_2O_3)_x(M_{y1}O_{y2})_{1-x}$, wherein M may be selected from Sr, Ba, Y, Gd, Nb, Ta, Mo, W, Cd, Er and combinations thereof, and x is greater than or equal to 0 and less than or equal to 1.
16. $CaTi_{0.7}Al_{0.3}O_{3-x}$, wherein x is greater than or equal to 0

TABLE 3-continued

Ionic Conductor Ion Transport Materials and less than or equal to 1.
17. $CaTi_{0.5}Al_{0.5}O_{3-d}$, wherein d is determined by stoichiometry.
18. $CaTi_{0.95}Mg_{0.05}O_{3-d}$, wherein d is determined by stoichiometry.
19. $ZrO_2$—$Tb_4O_7$
20. $ZrO_2$—$Y_2O_3$—$Bi_2O_3$
21. $BaCeO_3$:Gd
22. $BaCeO_3$; $BaCeO_3$: Y; $BaCeO_3$: Nd
23. $La_xSr_{1-x}Ga_yMg_{1-y}O_{3-d}$,
wherein x is greater than or equal to 0 and less than or equal
to 1, y is greater than or equal to 0 and less than
or equal to 1, and d is determined by stoichiometry.

For a given application, the size of the chosen ion transport membrane is typically linked to the flux (i.e., the quantity of oxygen per unit area per unit time) of oxygen therethrough. High values of oxygen flux are desirable so that a smaller ion transport membrane area may be used to efficiently remove oxygen from the heated, compressed gas entering the ion transport reactor. The smaller ion transport membrane area reduces capital expense. The oxygen flux at any location on the ion transport membrane depends on many factors, including the ionic conductivity of the electrolyte, the thickness of the membrane and the difference in oxygen chemical potential. The material selection for a membrane type gas reaction favors a material of optimum stability with adequate conductivity. A compromise on conductivity can be made because of the high oxygen pressure ratio driving force. Maintaining the ion transport membrane at a sufficiently high temperature (typically above 400° C., more typically above 600° C.) contributes to performance optimization in the process and system of this invention, because the ion transport membrane possesses appreciable oxygen ion conductivity at elevated temperatures and the conductivity increases with increasing temperatures. The higher temperatures may also enhance the kinetics of surface exchange processes at the surfaces of the ion transport membrane.

Specific features of the invention are shown in one or more of the drawings for convenience only, as each feature may be combined with other features in accordance with the invention. Alternative embodiments will be recognized by those skilled in the art and are intended to be included within the scope of the claims.

What is claimed is:

1. A process for producing an oxidized product in conjunction with a gas turbine system for generating power comprising the steps of:
   (a) contacting a compressed and heated oxygen-containing gas stream with at least one solid electrolyte oxygen ion transport membrane in a reactor, said reactor having a retentate zone and a permeate zone separated by said membrane, wherein at least a portion of oxygen is transported across said membrane from said retentate zone to said permeate zone to generate a permeate stream and an oxygen-depleted retentate stream;
   (b) passing a reactant into said permeate zone to react with said transported oxygen to generate an oxidized product therefrom;
   (c) adding said oxygen-depleted retentate stream to a gas turbine combustor; and
   (d) expanding in a gas turbine said combusted oxygen-depleted gas stream recovered from said gas turbine combustor, thereby generating power.

2. The process of claim 1 wherein said compressed oxygen-containing gas is extracted from a gas turbine compressor prior to step (a).

3. The process of claim 1 further comprising obtaining an expanded, oxygen-depleted gas stream from said turbine and recovering heat from said expanded, oxygen-depleted gas stream.

4. The process of claim 1 wherein a portion of said oxygen-containing gas stream is compressed by a compressor driven at least partially by said turbine and supplemental compressed oxygen-containing gas stream is added to said compressed oxygen-containing gas stream prior to contacting said membrane in step (a).

5. The process of claim 1 wherein said reactant is mixed with a moderator prior to passing into said permeate zone.

6. The process of claim 5 wherein a moderator is selected from the group consisting of steam, carbon dioxide and argon.

7. The process in claim 1 wherein said permeate stream is directed to preheat said oxygen-containing gas stream and said reactant.

8. The process of claim 1 wherein said retentate stream is mixed with a reactant prior to or during combustion in said gas turbine combustor of step (c).

9. The process of claim 1 wherein said oxygen-containing gas stream flows in a co-current direction relative to that of said reactant in step (b).

10. The process of claim 1 wherein said oxygen-containing gas stream flows in a countercurrent flow direction relative to said flow of said reactant in step (b).

11. The process of claim 1 wherein prior to contacting said membrane, a portion of said compressed and heated oxygen-containing gas is heated by a combustion reaction in a combustor using a fuel.

12. The process of claim 1 wherein at least a portion of the heat required to maintain the reactor at the desired operating temperature is supplied internally to said reactor by an exothermic partial oxidation reaction.

13. The process of claim 1 wherein the operating temperature of said membrane is within a range of from about 500° C. to about 1200° C.

14. The process of claim 13 wherein said operating temperature of said membrane is within a range of from about 900° C. to about 1100° C.

15. The process of claim 1 wherein the pressure of said permeate zone is higher than the pressure of said retentate zone.

16. A process for producing substantially sulfur-free oxidized product gas in conjunction with a gas turbine for generating power comprising the steps of:
   (a) contacting a compressed and heated oxygen-containing gas stream with at least one solid electrolyte oxygen ion transport membrane in a reactor, said reactor having a retentate zone and a permeate zone separated by said membrane, wherein at least a portion of oxygen is transported across said membrane from said retentate zone to said permeate zone to generate a permeate stream and an oxygen-depleted retentate stream;
   (b) passing a reactant into said permeate zone to react with said transported oxygen to generate an oxidized product therefrom;
   (c) passing said oxidized product from step (b) into an acid gas remover to recover sulfur resulting in a substantially sulfur-free partially oxidized product;
   (d) adding said oxygen-depleted retentate stream in a gas turbine combustor;

(e) combusting said sulfur-free partially oxidized product in said gas turbine combustor; and (f) expanding in a gas turbine expander said combusted oxygen-depleted gas stream recovered from a gas turbine combustor, thereby generating power.

17. The process of claim 16 wherein a supplemental compressed oxygen-containing gas stream is added to said compressed oxygen-containing gas stream prior to contacting said membrane in step (a).

18. The process of claim 16 wherein a moderator is added to said reactant prior to contacting said membrane.

19. The process in claim 16 wherein said permeate stream is used to preheat said oxygen-containing gas stream and said reactant.

20. The process of claim 16 further comprising using the power generated in the step (d) to operate a heat recovery steam turbine.

* * * * *